US012684472B2

(12) United States Patent
Tamura et al.

(10) Patent No.: US 12,684,472 B2
(45) Date of Patent: Jul. 14, 2026

(54) UE, CORE NETWORK NODE, AN NODE, AND METHODS THEREFOR

(71) Applicant: NEC Corporation, Tokyo (JP)

(72) Inventors: Toshiyuki Tamura, Tokyo (JP); Tsuyoshi Takakura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 386 days.

(21) Appl. No.: 18/030,389

(22) PCT Filed: Aug. 26, 2021

(86) PCT No.: PCT/JP2021/031363
    § 371 (c)(1),
    (2) Date: Apr. 5, 2023

(87) PCT Pub. No.: WO2022/080016
    PCT Pub. Date: Apr. 21, 2022

(65) Prior Publication Data
    US 2023/0379810 A1      Nov. 23, 2023

(30) Foreign Application Priority Data

Oct. 16, 2020    (JP) ................................. 2020-174587

(51) Int. Cl.
    *H04W 48/18*        (2009.01)
    *H04W 36/08*        (2009.01)
(52) U.S. Cl.
    CPC ........... *H04W 48/18* (2013.01); *H04W 36/08* (2013.01)

(58) Field of Classification Search
    CPC .............................. H04W 48/18; H04W 36/08
    See application file for complete search history.

(56) References Cited

U.S. PATENT DOCUMENTS

| | | | |
|---|---|---|---|
| 2021/0092725 A1 | 3/2021 | Park et al. | |
| 2022/0007274 A1 | 1/2022 | Jin et al. | |
| 2022/0345990 A1 | 10/2022 | Godin et al. | |
| 2023/0189192 A1* | 6/2023 | Talebi Fard | ........ H04W 12/088 726/4 |
| 2023/0276324 A1* | 8/2023 | Sebire | ............... H04W 36/0058 370/331 |

FOREIGN PATENT DOCUMENTS

| | | |
|---|---|---|
| CN | 111769964 A | 10/2020 |
| JP | 2020-170896 A | 10/2020 |

(Continued)

OTHER PUBLICATIONS

JP Office Action for JP Application No. 2022-556446, mailed on Jan. 16, 2024 with English Translation.

(Continued)

*Primary Examiner* — Justin Y Lee

(74) *Attorney, Agent, or Firm* — Sughrue Mion, PLLC

(57)                ABSTRACT

A UE (1) receives, from a network (9, B), control information indicating an association of each of at least one Closed Access Group (CAG) ID with at least one network slice identifier. The UE (1) performs cell selection or cell reselection using the received control information. This allows the UE to take into account the availability of a network slice in cell selection and cell reselection in the case of a Public network integrated Non-Public Network (PNI-NPN), for example.

12 Claims, 12 Drawing Sheets

RECEIVE SWC INFORMATION INDICATING ASSOCIATION BETWEEN CAG ID AND S-NSSAI(s) FROM AMF ⟋501

PERFORM CELL SELECTION OR CELL RESELECTION USING RECEIVED SWC INFORMATION ⟋502

(56)　　　　　　References Cited

FOREIGN PATENT DOCUMENTS

| WO | 2020/186387 A1 | 9/2020 |
| WO | 2020/187194 A1 | 9/2020 |
| WO | 2020/198632 A1 | 10/2020 |

OTHER PUBLICATIONS

ZTE, "Discussion and proposal on the relation between CAG and slice", 3GPP TSG SA WG2 #131 S2-1902001, Feb. 19, 2019, pp. 1-pp. 2.

SA2, "Reply LS on NG-RAN behaviour upon AMF triggered changes of the MRL for PNI-NPN", 3GPP TSG SA WG2 #140e S2-2005904, Aug. 31, 2020, pp. 1-pp. 7.

Extended European Search Report for EP Application No. 21879758.7, dated on Mar. 7, 2024.

Nokia, Nokia Shanghai Bell: "KI#7 new solution On selection of suitable cell for a S-NSSAI", 3GPP Draft; S2-2003963, May 22, 2020, pp. 1-3.

"3rd Generation Partnership Project; Technical Specification Group Services and System Aspects; Study on enhanced support of nonpublic networks (Release 17)", 3GPP TR 23.700-07 V1.0.0 (Sep. 2020), Sep. 9, 2020, pp. 1-215.

International Search Report for PCT Application No. PCT/JP2021/031363, mailed on Nov. 22, 2021.

3GPP SA WG1, "New WID on Study on Enhanced Access to and Support of Network Slice (from S1-202284)", SP-200571, 3GPP TSG SA Meeting # 88e, Electronic Meeting, Jun. 30-Jul. 3, 2020.

3GPP TS 23.122 V16.7.0 (Sep. 2020) "3rd Generation Partnership Project; Technical Specification Group Core Network and Terminals; Non-Access-Stratum (NAS) functions related to Mobile Station (MS) in idle mode (Release 16)", Sep. 2020.

CN Office Action for CN Application No. 202180070500.0, mailed on Aug. 15, 2025 with English Translation.

MediaTek Inc., "Correction on UE consideration for CAG cells", 3GPP Draft: C1-203302, May 26, 2020.

* cited by examiner

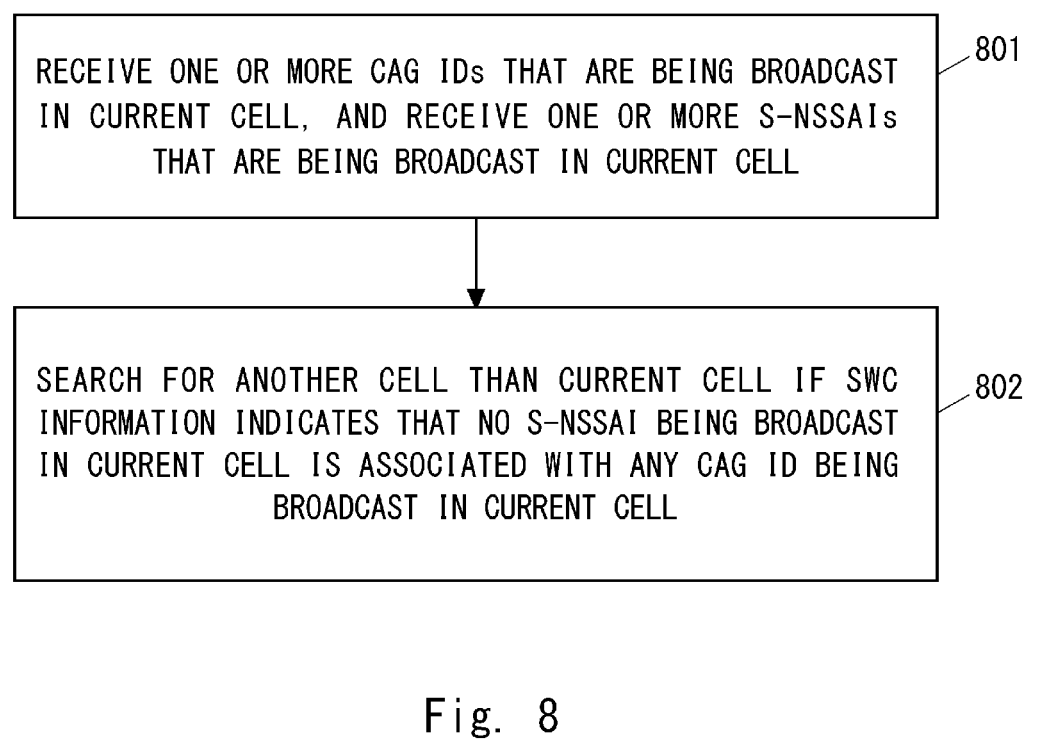

RECEIVE ONE OR MORE CAG IDs THAT ARE BEING BROADCAST IN CURRENT CELL, AND RECEIVE ONE OR MORE S-NSSAIs THAT ARE BEING BROADCAST IN CURRENT CELL ⌐801

SEARCH FOR ANOTHER CELL THAN CURRENT CELL IF SWC INFORMATION INDICATES THAT NO S-NSSAI BEING BROADCAST IN CURRENT CELL IS ASSOCIATED WITH ANY CAG ID BEING BROADCAST IN CURRENT CELL ⌐802

Fig. 8

OBTAIN, VIA BROADCAST IN CURRENT CELL, CONTROL INFORMATION INDICATING ASSOCIATION OF EACH OF ONE OR MORE CAG IDs WITH ONE OR MORE S-NSSAIs ⟋1101

SEARCH FOR ANOTHER CELL THAN CURRENT CELL IF NO S-NSSAI CONTAINED IN ALLOWED NSSAI STORED IN UE IS ASSOCIATED IN RECEIVED CONTROL INFORMATION WITH ANY ALLOWED CAG ID STORED IN UE ⟋1102

UE, CORE NETWORK NODE, AN NODE, AND METHODS THEREFOR

This application is a National Stage Entry of PCT/JP2021/031363 filed on Aug. 26, 2021, which claims priority from Japanese Patent Application 2020-174587 filed on Oct. 16, 2020, the contents of all of which are incorporated herein by reference, in their entirety.

TECHNICAL FIELD

The present disclosure relates to a radio communication network, and in particular to network slicing and a Non-public Network (NPN).

BACKGROUND ART

The 5G system (5GS) supports network slicing. Network slicing makes it possible to create multiple logical networks or non-virtualized logical networks on top of physical networks. For example, network slicing may use Network Function Virtualization (NFV) and software-defined networking (SDN) technologies to create multiple virtualized logical networks on top of physical networks. Each logical network is called a network slice. A network slices provides specific network capabilities and network characteristics. In order to form a single network slice, a network slice instance (NSI) is defined as a set of network function (NF) instances, resources (e.g., computer processing resources, storage, and networking resources), and an access network (AN) (one or both of a Next Generation Radio Access Network (NG-RAN) and a Non-3GPP Interworking Function (N3IWF)).

A network slice is identified by an identifier known as Single Network Slice Selection Assistance Information (S-NSSAI). The S-NSSAI consists of a Slice/Service type (SST) and a Slice Differentiator (SD). The SST refers to an expected network slice behavior in terms of features and services. The SD is optional information and complements the SST to differentiate amongst multiple network slices of the same Slice/Service type.

An S-NSSAI can have standard values or non-standard values. Currently, standard SST values 1, 2, 3, and 4 are associated respectively with enhanced Mobile Broad Band (eMBB), Ultra-Reliable and Low-Latency Communication (URLLC), Massive Internet of Things (MIoT), and Vehicle to Everything (V2X) slice types. A non-standard value of an S-NSSAI identifies a single network slice within a specific Public Land Mobile Network (PLMN). In other words, non-standard values are PLMN-specific values, and associated with the PLMN ID of a PLMN that has assigned them. Each S-NSSAI ensures network isolation by selecting a particular NSI. A NSI may be selected via different S-NSSAIs. An S-NSSAI may be associated with different NSIs. A network slice may be uniquely identified by an S-NSSAI.

There are two types of S-NSSAI, which are known as S-NSSAI and Mapped S-NSSAI. An S-NSSAI identifies a network slice provided by a serving Public Land Mobile Network (PLMN) to which a User Equipment (UE) is connected. Thus, when the UE is in its home network, an S-NSSAI identifies a network slice in the home network (e.g., Home PLMN (HPLMN)). During roaming, an S-NS-SAI identifies a network slice of the roaming network (e.g., Visited PLMN (VPLMN)). A Mapped S-NSSAI may be an S-NSSAI of the Home PLMN (HPLMN) that is mapped to (or is associated with, or corresponds to) an S-NSSAI identifying a network slice of the roaming network when the UE is roaming, and may also be an S-NSSAI included in the UE user's subscription information among them.

Meanwhile, Network Slice Selection Assistance Information (NSSAI) means a set of S-NSSAIs. Accordingly, one or more S-NSSAIs can be included in one NSSAI. There are multiple types of NSSAI, known as Configured NSSAI, Requested NSSAI, Allowed NSSAI, Rejected NSSAI, and Pending NSSAI.

Configured NSSAI includes one or more S-NSSAIs each applicable to one or more PLMNs. For example, Configured NSSAI is configured by a Serving PLMN and is applied to the Serving PLMN. Alternatively, Configured NSSAI may be Default Configured NSSAI. Default Configured NSSAI is configured by the Home PLMN (HPLMN) and applies to any PLMNs for which no specific Configured NSSAI has been provided. For example, a radio terminal (User Equipment (UE)) is provisioned with Default Configured NSSAI from a Unified Data Management (UDM) of the HPLMN via an Access and Mobility Management Function (AMF).

Requested NSSAI is signaled by a UE to a network in, for example, a registration procedure, allowing the network to determine a serving AMF, at least one network slice and at least one NSI, for this UE.

Allowed NSSAI is provided to a UE by a Serving PLMN and indicates one or more S-NSSAIs that the UE can use in its current registration area (RA) of the Serving PLMN. Allowed NSSAI is determined by an AMF of the Serving PLMN during, for example, a registration procedure. Allowed NSSAI is signaled to the UE by the network (i.e., AMF) and stored in memories (e.g., non-volatile memories) of both the AMF and the UE.

Rejected NSSAI includes one or more S-NSSAIs rejected by the current PLMN. Rejected NSSAI may be referred to as rejected S-NSSAI(s). An S-NSSAI is rejected throughout the current PLMN or rejected in the current registration area (RA). If an AMF rejects any of one or more S-NSSAIs included in Requested NSSAI, for example, in a registration procedure of a UE, the AMF includes them in Rejected NSSAI. Rejected NSSAI is signaled to the UE by the network (i.e., AMF) and stored in memories of both the AMF and the UE.

Pending NSSAI indicates one or more S-NSSAIs for which Network Slice-Specific Authentication and Authorization (NSSAA) is pending. A Serving PLMN shall perform NSSAA for an S-NSSAI(s) of the HPLMN which are subject to NSSAA based on subscription information. In order to perform NSSAA, an AMF invokes an Extensible Authentication Protocol (EAP)-based authorization procedure. The EAP-based authentication procedure takes a relatively long time to obtain its outcome. Accordingly, whilst the AMF determines Allowed NSSAI as described above during a registration procedure of a UE, it does not include an S-NSSAI(s) subject to NSSAA in the Allowed NSSAI, but instead them in Pending NSSAI. Pending NSSAI is signaled to the UE by the network (i.e., AMF) and stored in memories of both the AMF and the UE.

The 3rd Generation Partnership Project (3GPP) is studying enhancements to network slices for Release 17. In addition, the 3GPP Technical Specification Group Services and System Aspects (TSG-SA) Working Group 1 (WG1) has approved a new working/study item for Release 18 to investigate the feasibility of Enhanced Access to and Support of Network Slice (see Non-Patent Literature 1). One of the objectives of this study item is to identify various deployment and usage scenarios of network slices, when there is a restriction of network slice to e.g., certain frequency bands/sub bands, Radio Access Technologies (RATs), geographical areas, networks and applications. Another one of the objectives of this study item is to identify various deployment and usage scenarios of network slices, when a User Equipment (UE) has a subscription to multiple network slices and these network slices are deployed for e.g., different frequency bands/sub bands, Radio Access Technologies (RATs), geographical area and applications.

The 3GPP has introduced support for a Non-Public Network (NPN) in Release 16. An NPN enables the deployment of a 5G System for private use. An NPN is deployed as a Stand-alone Non-Public Network (SNPN) or a Public network integrated NPN (PNI-NPN). An SNPN is operated by an NPN operator and does not depend on network functions provided by any Public Land Mobile Network (PLMN). In contrast, a PNI-NPN is an NPN that is deployed with the support of a PLMN. A PNI-NPN becomes available via a PLMN. There are several scenarios for PNI-NPN deployment. In one scenario, a PNI-NPN uses radio access of a PLMN through RAN sharing. In another scenario, a PNI-NPN uses radio access of a PLMN and also uses network functions (e.g., control plane functions) of the core network (5GC) of the PLMN. In still another scenario, a PNI-NPN is fully hosted in a PLMN and provided as a network slice of the PLMN.

In the PNI-NPN case, a PLMN ID identifies a network and a Closed Access Group (CAG) ID identifies CAG Cells. A CAG cell broadcasts one or more CAG IDs per PLMN. To support CAG, a UE is configured with an Allowed CAG list, i.e., a list of CAG IDs to which the UE is allowed to access. A UE performs network selection and reselection based on PLMN ID and performs cell selection and reselection based on CAG ID. In other words, CAG is used to prevent UEs which are not allowed to access a PNI-NPN from attempting to access the NPN via the associated CAG cell(s).

CITATION LIST

Non Patent Literature

[Non-Patent Literature 1] 3GPP SA WG1, "New WID on Study on Enhanced Access to and Support of Network Slice (from S1-202284)", SP-200571, 3GPP TSG SA Meeting #88e, Electronic Meeting, Jun. 30-Jul. 3, 2020
[Non-Patent Literature 2] 3GPP TS 23.122 V16.7.0 (2020-09) "3rd Generation Partnership Project; Technical Specification Group Core Network and Terminals; Non-Access-Stratum (NAS) functions related to Mobile Station (MS) in idle mode (Release 16)", September 2020

SUMMARY OF INVENTION

Technical Problem

At present, it is not clear how a UE and a network deal with various restrictions on the use of network slices (e.g., restrictions related to frequency bands, geographic areas, or applications). For example, in the case of PNI-NPN, it is not clear how a UE considers the availability of network slices during cell selection or reselection based on CAG ID.

One of the objects to be attained by embodiments disclosed herein is to provide apparatuses, methods, and programs that allow a UE to take into account the availability of a network slice in cell selection and cell selection in the PNI-NPN case. It should be noted that this object is merely one of the objects to be attained by the embodiments disclosed herein. Other objects or problems and novel features will be made apparent from the following description and the accompanying drawings.

Solution to Problem

In a first aspect a User Equipment (UE) includes at least one memory and at least one processor coupled to the at least one memory. The at least one processor is configured to receive, from a network, control information indicating an association of each of at least one CAG ID with at least one network slice identifier, and perform cell selection or cell reselection using the control information.

In a second aspect, a core network node for mobility management used in a core network includes at least one memory and at least one processor coupled to the at least one memory. The at least one processor is configured to send, to a UE, control information indicating an association of each of at least one CAG ID with at least one network slice identifier.

In a third aspect, an access network (AN) node used in an AN includes at least one memory and at least one processor coupled to the at least one memory. The at least one processor is configured to broadcast, in a cell, control information indicating an association of each of at least one Closed Access Group (CAG) ID with at least one network slice identifier.

In a fourth aspect, a method performed by a UE includes: receiving, from a network, control information indicating an association of each of at least one CAG ID with at least one network slice identifier; and performing cell selection or cell reselection using the control information.

In a fifth aspect, a method performed by a core network node for mobility management used in a core network includes sending, to a UE, control information indicating an association of each of at least one CAG ID with at least one network slice identifier.

In a sixth aspect, a method performed by an AN node used in an AN includes broadcasting, in a cell, control information indicating an association of each of at least one Closed Access Group (CAG) ID with at least one network slice identifier.

In a seventh aspect, a program includes a set of instructions (software codes) that, when loaded into a computer, cause the computer to perform the method according to the fourth, fifth, or sixth aspect described above.

Advantageous Effects of Invention

According to the above-described aspects, it is possible to provide apparatuses, methods, and programs that allow a UE to take into account the availability of a network slice in cell selection and cell selection in the PNI-NPN case.

BRIEF DESCRIPTION OF DRAWINGS

FIG. 8 is a flowchart showing an example of an operation of a UE according to an embodiment;

EXAMPLE EMBODIMENT

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3GPP fifth generation mobile communication system (5G system (5GS)). However, these embodiments may be applied to other cellular communication systems that support network slicing and non-public networks similar to those in 5GS.

First Embodiment

Figure 1:
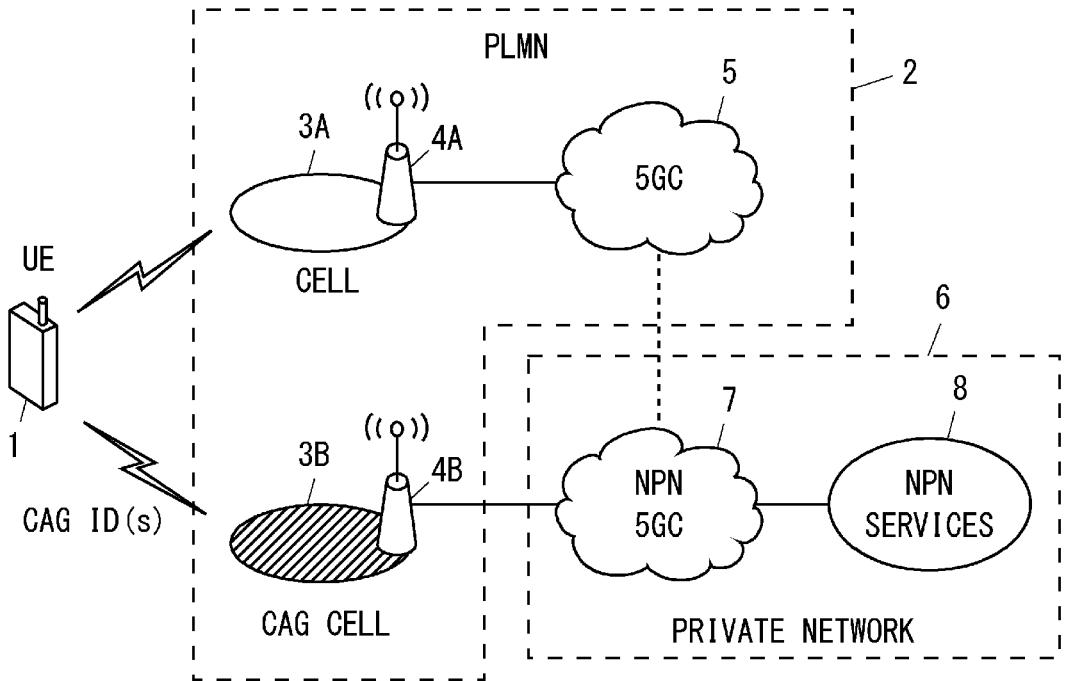
FIG. 1 shows an example configuration of a communication network according to an embodiment.

FIG. 1 shows an example configuration of a PNI-NPN according to this embodiment. A PLMN 2 includes one or more Access Network (AN) nodes 4 and a core network (5G Core (5GC)) 5. Each AN node 4 may be a gNB. An AN node 4A provides a normal PLMN cell 3A that is accessible to UEs with subscriptions to the PLMN. An AN node 4B provides a CAG cell 3B that is accessible only to UEs allowed to access the PNI-NPN. The AN node 4B broadcasts, in the CAG cell 3B, one or more CAG IDs per PLMN. A UE 1 receives one or more CAG IDs being broadcast in the CAG cell 3B and compares them with an Allowed CAG list configured in the UE 1. If any of the CAG IDs being broadcast in the CAG cell 3B is included in the Allowed CAG list, then the UE 1 is allowed to access a private network 6 of the NPN operator via the CAG cell 3B corresponding to that CAG ID, and use NPN services 8.

The configuration shown in FIG. 1 may be modified in various ways. For example, the AN node 4B may also be connected to the 5GC of the PLMN 2 and further provide one or more normal PLMN cells. Meanwhile, the NPN 5GC 7 may be connected to the 5GC 5 of the PLMN 2 and use network functions of the 5GC 5. For example, the NPN 5GC 7 may provide only user plane functions and use control plane functions (e.g., AMF, SMF, Network Slice Selection Function (NSSF), Unified Data Management (UDM)). In addition, the NPN 5GC 7 may be fully hosted in the 5GC 5 of the PLMN 2 and served as a network slice in the 5GC 5 of the PLMN 2.

Figure 2:
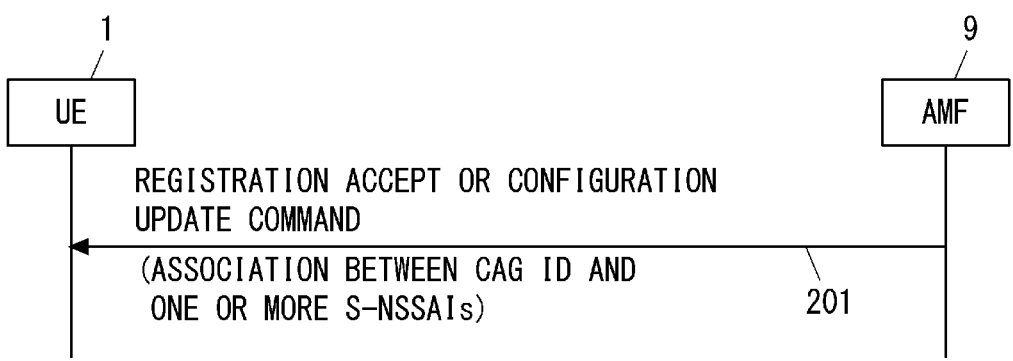
FIG. 2 is a sequence diagram showing an example of operations of a UE and an AMF according to an embodiment.

FIG. 2 shows an example of signaling between the UE 1 and an AMF 9. The AMF 9 may be included in the 5GC 5 of the PLMN 2 or in the NPN 5GC 7. In step 201, during a Registration procedure or UE Configuration Update procedure, the AMF 9 provides the UE 1 with control information indicating an association of each of at least one CAG ID with at least one S-NSSAI. In the following, this control information is referred to as Slice with CAG (SWC) information. More specifically, the AMF 9 sends the SWC information to the UE 1 via a Registration Accept message or a Configuration Update Command message. At least one CAG ID contained in the SWC information may also be included in the Allowed CAG list of the UE 1. The UE 1 performs cell selection or cell reselection or both using the SWC information.

Figure 3:
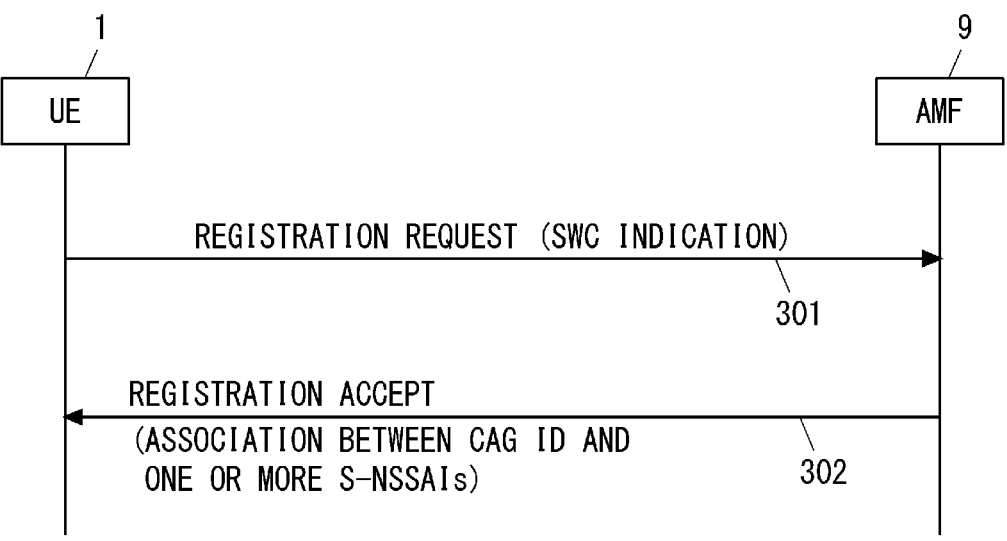
FIG. 3 is a sequence diagram showing an example of operations of a UE and an AMF according to an embodiment.

FIG. 3 shows a modification of the signaling shown in FIG. 2. In some implementations, the UE 1 may include a request for SWC information (e.g., SWC INDICATION) in a Registration Request message (step 301). The request (e.g., SWC INDICATION) may be an indication or capability information indicating support for cell selection and cell reselection using SWC information. In response to determining that the registration request message contains a request for SWC information (e.g., SWC INDICATION), the AMF 9 may include the SWC information in a registration accept message (step 302). According to this procedure, the AMF 9 can know whether or not the UE 1 supports cell selection and cell reselection using SWC information. Accordingly, the AMF 9 can operate to configure the UE 1 with SWC information only if the UE 1 supports that. The request for SWC information (e.g., SWC INDICATION) may indicate one or more S-NSSAIs with which the UE 1 wishes to be provided with an association to CAG IDs.

The UE 1 may receive the SWC information and Allowed NSSAI from the AMF 9 via a single NAS message, or from the AMF 9 via different NAS messages. The Allowed NSSAI indicates at least one S-NSSAI provided by the Serving PLMN to the UE 1 and available for use by the UE 1 in the current Registration Area (RA) of the Serving PLMN. Essentially, each S-NSSAI included in the Allowed NSSAI is available throughout the registration area of the UE 1. However, in this embodiment, if there are restrictions on the use of a network slice identified by an S-NSSAI included in the Allowed NSSAI, the UE 1 may not be able to use that S-NSSAI even within the current registration area. Restrictions on the use of a network slice may include at least one of: a restriction on radio frequencies (e.g., frequency bands or sub-bands) with which the network slice is available, a restriction on radio access technologies with which the network slice is available, a restriction on geographic areas in which the network slice is available, a restriction on applications with which the network slice is available, or a restriction based on priorities among multiple network slices.

In one example, a given S-NSSAI included in the Allowed NSSAI may be available only in one or more specific frequency bands, or may be unavailable in one or more specific frequency bands. In one example, a given S-NSSAI in the Allowed NSSAI may be available only in one or more specific RATs, or may be unavailable in one or more specific RATs. In one example, a given S-NSSAI included in the Allowed NSSAI may be available only in one or more specific geographic areas, or may be unavailable in one or more specific geographic areas. Each geographic area may be a tracking area or a cell. In one example, a given S-NSSAI included in the Allowed NSSAI may be available only for one or more specific applications (or services), or may be unavailable for one or more specific applications (or services). In one example, there may be priorities among multiple S-NSSAIs included in the Allowed NSSAI. For example, the UE 1 cannot simultaneously use a network slice with a lower priority when the UE 1 is using a network slice given a higher priority. Alternatively, a restriction may be imposed that a given S-NSSAI in the Allowed NSSAI cannot be used simultaneously with any other network slices.

The UE 1 may receive the SWC information and an Allowed CAG list from the AMF 9 via a single NAS message or via different NAS messages. The Allowed CAG list is a list of CAG IDs to which the UE 1 is allowed to access.

Figure 4:
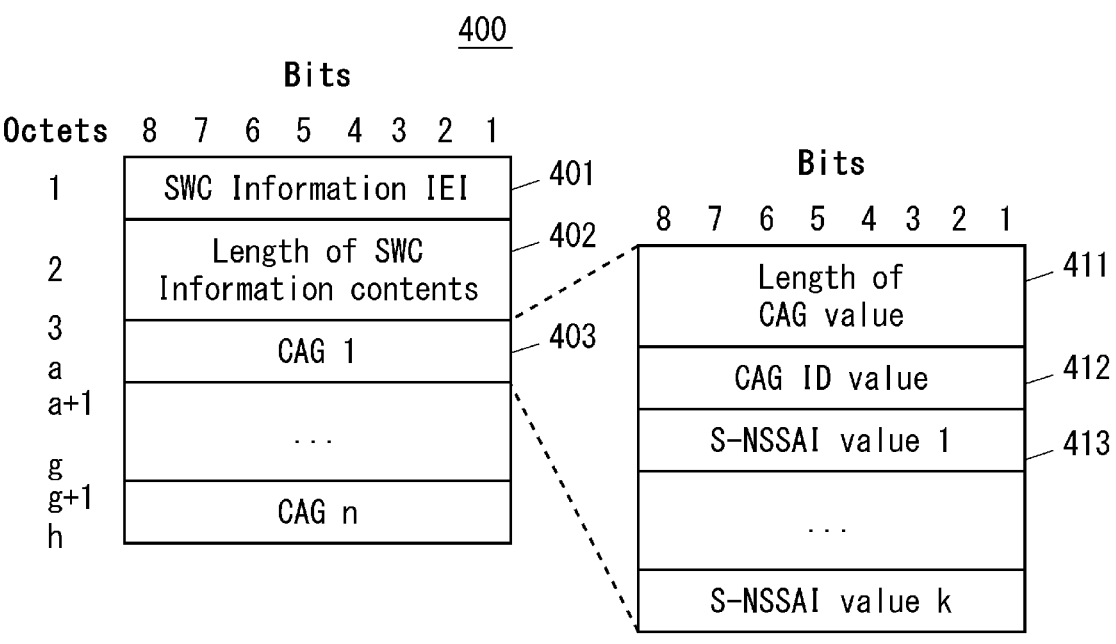
FIG. 4 shows an example of the format of an SWC information list according to an embodiment.

FIG. 4 shows an example of the format of the SWC information. In the example in FIG. 3, an SWC Information Element (IE) 400 includes an SWC Information IE Identifier (IEI) field 401, a Length of SWC Information contents field 402, and one or more CAG fields 403. The SWC Information IEI field 401 contains an identifier of the SWC Information IE 400. The Length of SWC Information contents field 402 indicates the length in octets of the contents contained in the SWC Information IE 400.

Each CAG field 403 indicates one CAG ID and one or more S-NSSAIs associated with this CAG ID. Specifically, each CAG field 403 includes a Length of CAG value field 411, a CAG ID value field 412, and one or more S-NSSAI value fields 413. The Length of CAG value field 411 indicates the length in octets of the contents contained in the CAG field 403. The CAG ID value field 412 indicates the value of a CAG ID. Each S-NSSAI value field 413 indicates the value of one S-NSSAI. In other words, the CAG ID indicated by the CAG ID value field 412 is associated with the one or more S-NSSAIs indicated in the one or more S-NSSAI value fields 413.

Figure 5:
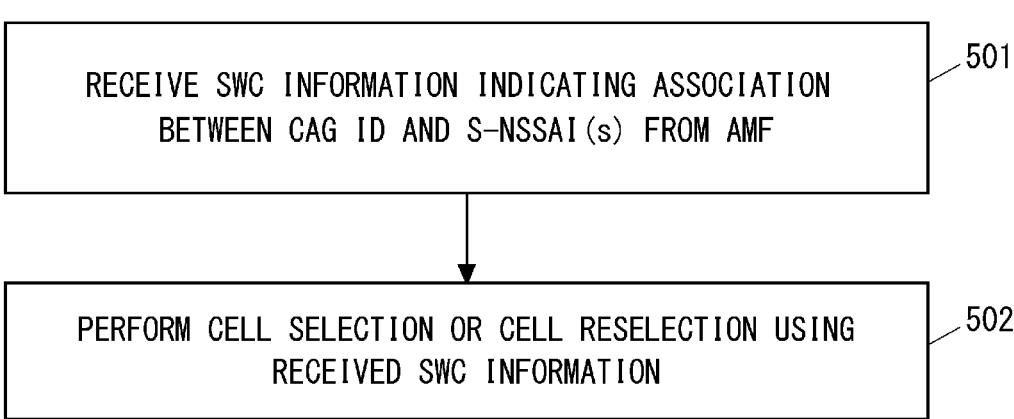
FIG. 5 is a flowchart showing an example of an operation of a UE according to an embodiment.

The following provides a specific example of the behavior of the UE 1 after receiving the SWC information from the AMF 9. FIG. 5 shows an example of the operation of the UE 1. In step 501, the UE 1 receives control information (i.e., SWC information) indicating an association between a CAG ID and an S-NSSAI(s) from the AMF 9 in the core network (i.e., 5GC 5 or 7). In step 502, the UE 1 performs cell selection or cell reselection using the received SWC information.

Figure 6:
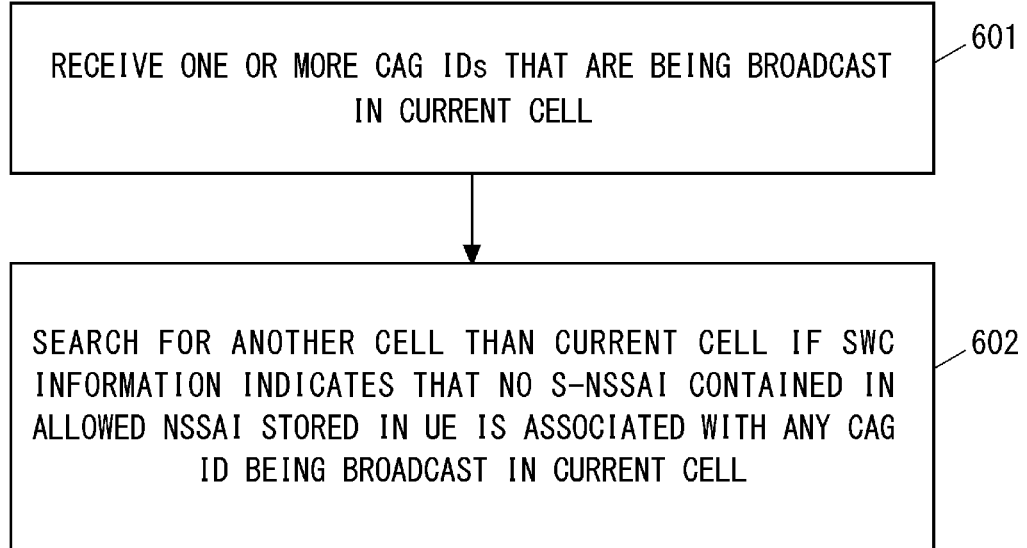
FIG. 6 is a flowchart showing an example of an operation of a UE according to an embodiment.

FIG. 6 shows an example of cell selection and reselection performed by the UE 1. In step 601, the UE 1 receives one or more CAG IDs that are being broadcast in its current cell. In step 602, the UE 1 searches for a cell different from the current cell if the SWC information indicates that no S-NSSAI contained in the Allowed NSSAI stored in the UE 1 are associated with any CAG ID being broadcast in the current cell.

Figure 7:
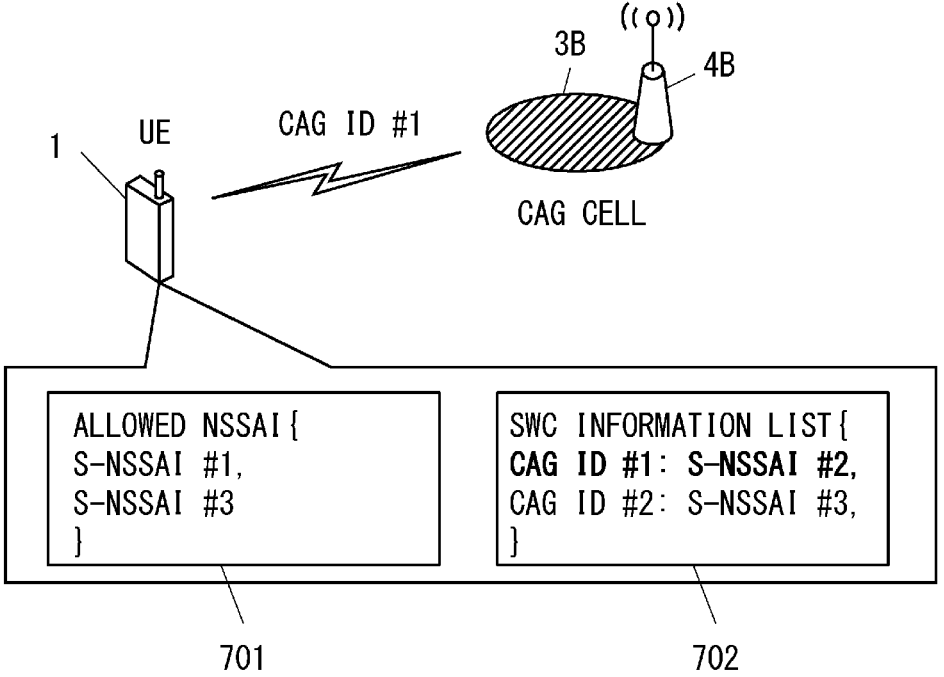
FIG. 7 is a diagram showing an example of an operation of a UE according to an embodiment.

FIG. 7 shows a specific example of the cell selection and reselection shown in FIG. 6. In the example in FIG. 7, the CAG cell 3B broadcasts CAG ID #1. The UE 1 has been configured with Allowed NSSAI 701 and an SWC Information list 702. The Allowed NSSAI 701 indicates S-NSSAI #1 and S-NSSAI #3. The SWC Information list 702 indicates an association between CAG ID #1 and S-NSSAI #2, as well as an association between CAG ID #2 and S-NSSAI #3. Note that both CAG ID #1 and CAG ID #2 contained in the SWC information list 702 are also included in the Allowed CAG list of the UE 1. The SWC information list 702 and the Allowed CAG list may be one integrated list. In the example in FIG. 7, CAG ID #1, which is being broadcast in the CAG cell 3B, is not associated in the SWC information list 702 with any of the S-NSSAIs included in the Allowed NSSAI 701. Accordingly, the UE 1 performs a cell reselection to search for another cell. In this case, the UE 1 may delete the CAG ID(s) being broadcast in the current cell (i.e., CAG ID #1 in the example in FIG. 7) from the Allowed CAG list for the current PLMN.

More specifically, if the UE 1 has received a CAG information list containing the identifier of the current PLMN, the UE 1 performs the following actions. The UE 1 searches for a cell other than the current cell if one or more CAG IDs supported by the CAG cell in which the UE 1 resides are included in the CAG information list in association with the current PLMN, if access by the UE 1 to the 5GS is restricted to via CAG cells, and if none of the one or more CAG IDs being broadcast in the CAG cell in which the UE 1 resides (i.e., the CAG ID(s) in question) is associated in the SWC Information list 702 with any of the S-NSSAI(s) included in the Allowed NSSAI 701. The UE 1 may remove the CAG ID(s) in question from the Allowed CAG list for the current PLMN. The CAG information list includes the PLMN identifier (PLMN ID), the Allowed CAG list, and an indication of whether access by the UE to the 5GS is restricted to via CAG cells (see Non-Patent Literature 2, Section 3.8).

FIG. 8 shows another example of cell selection and reselection performed by the UE 1. In step 801, the UE 1 receives one or more CAG IDs that are being broadcast in its current cell. In addition, the UE 1 receives one or more S-NSSAIs that are being broadcast in the current cell. In step 802, the UE 1 searches for a cell other than the current cell if the SWC information indicates that none of the S-NSSAI(s) being broadcast in the current cell is associated with any of the CAG ID(s) being broadcast in the current cell.

Figure 9:
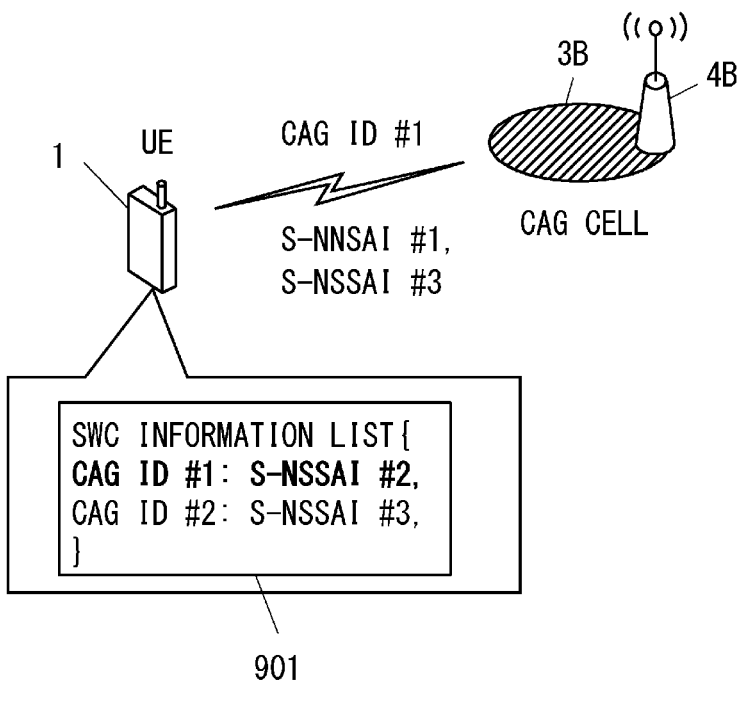
FIG. 9 is a diagram showing an example of an operation of a UE according to an embodiment.

FIG. 9 shows a specific example of the cell selection and reselection shown in FIG. 8. In the example in FIG. 9, the CAG cell 3B broadcasts CAG ID #1 and broadcasts S-NS-SAI #1 and S-NSSAI #3. The UE 1 has been configured with a SWC information list 901. The SWC Information list 901 indicates an association between CAG ID #1 and S-NSSAI #2, as well as an association between CAG ID #2 and S-NSSAI #3. Note that both CAG ID #1 and CAG ID #2 contained in the SWC information list 901 are also included in the Allowed CAG list of the UE 1. The SWC information list 901 and the Allowed CAG list may be one integrated list. In the example in FIG. 9, CAG ID #1, which is being broadcast in the CAG cell 3B, is not associated in the SWC information list 901 with S-NSSAI #1 or S-NSSAI #3, which is being broadcast in the CAG cell 3B. Accordingly, the UE 1 performs a cell reselection to search for another cell. In this case, the UE 1 may delete the CAG ID(s) being broadcast in the current cell (i.e., CAG ID #1 in the example in FIG. 9) from the Allowed CAG list for the current PLMN.

More specifically, if the UE 1 has received a CAG information list containing the identifier of the current PLMN, the UE 1 performs the following actions. The UE 1 searches for a cell other than the current cell if one or more CAG IDs supported by the CAG cell in which the UE 1 resides are included in the CAG information list in association with the current PLMN, if access by the UE to the 5GS is restricted to via CAG cells, and if none of the one or more CAG IDs being broadcast in the CAG cell in which the UE 1 resides (i.e., the CAG ID(s) in question) is associated in the SWC Information list 901 with any of the one or more S-NSSAIs being broadcast in the CAG cell in which the UE 1 resides. The UE 1 may remove the CAG ID(s) in question from the Allowed CAG list for the current PLMN. The CAG information list includes the PLMN identifier (PLMN ID), the Allowed CAG list, and an indication of whether access by the UE to the 5GS is restricted to via CAG cells (see Non-Patent Literature 2, Section 3.8).

In this embodiment, the AMF 9 provides the UE 1 with control information (SWC information) indicating an association of each of at least one CAG ID with at least one S-NSSAI. The UE 1 then performs cell selection or reselection or both, taking into account the SWC information. This allows the UE 1 to consider the availability of network slices in cell selection or reselection based on CAG ID.

Second Embodiment

Figure 10:
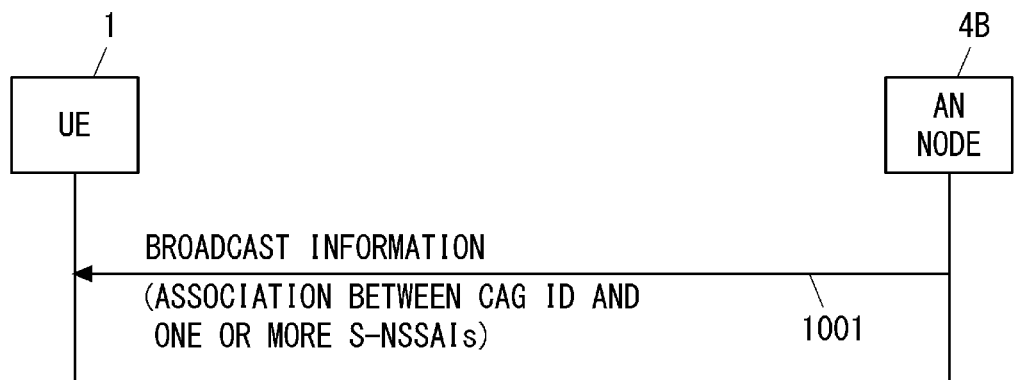
FIG. 10 is a sequence diagram showing an example of operations of a UE and an AN node according to an embodiment.

An example configuration of a communication network according to this embodiment is the same as the example described with reference to FIG. 1. FIG. 10 shows an example of the operations of the UE 1 and the AN node 4B. In step 1001, the AN node 4B broadcasts, in the CAG cell 3B, control information indicating an association of each of at least one CAG ID with at least one S-NSSAI. The control information may be contained in system information (System Information Block (SIB)). System information, containing the control information, may be provided to the UE 1 via periodic broadcasts or may be provided to the UE 1 on an on-demand basis.

Figure 11:
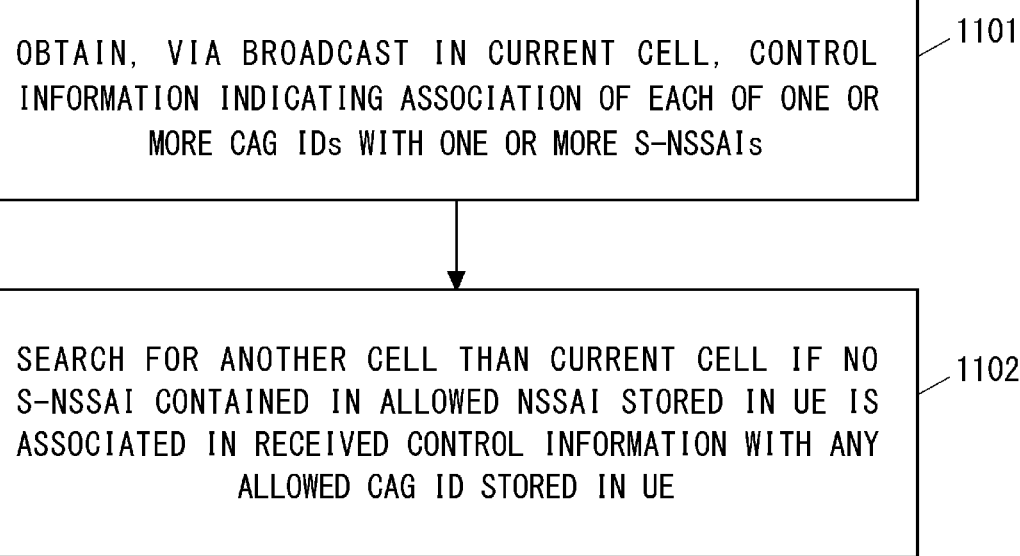
FIG. 11 is a flowchart showing an example of an operation of a UE according to an embodiment.

FIG. 11 shows an example of cell selection and reselection performed by the UE 1. In step 1101, the UE 1 obtains, via broadcast in its current cell, control information indicating an association of each of one or more CAG IDs with one or more S-NSSAIs. In step 1102, the UE 1 searches for a cell other than the current cell if no S-NSSAI contained in the Allowed NSSAI stored in the UE 1 is associated in the received control information with any Allowed CAG ID stored in the UE.

Figure 12:
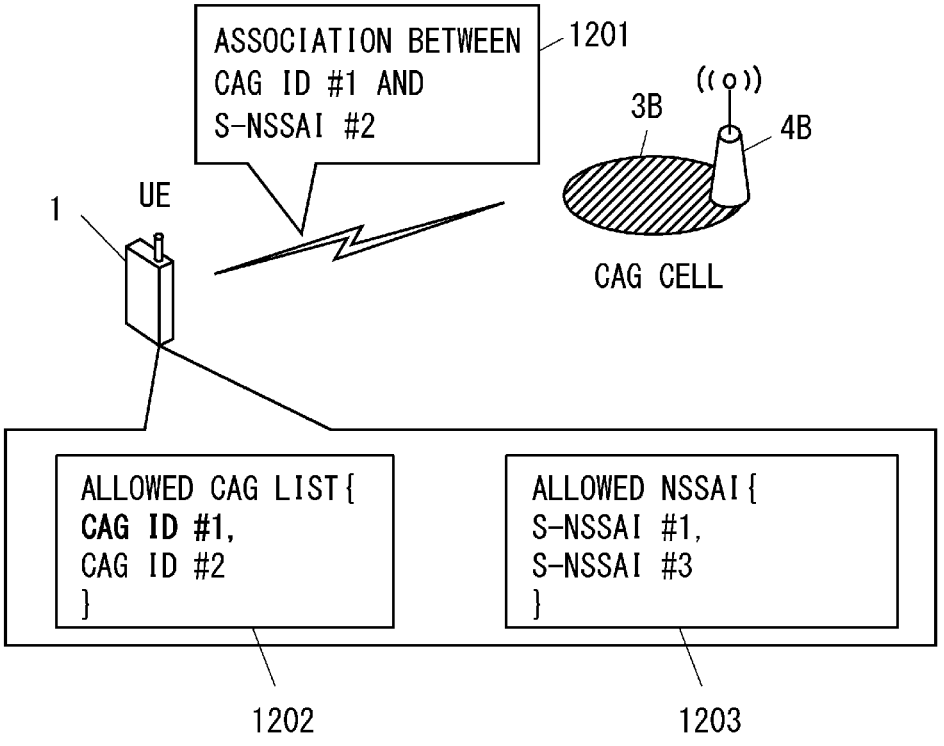
FIG. 12 is a diagram showing an example of an operation of a UE according to an embodiment.

FIG. 12 shows a specific example of the cell selection and reselection shown in FIG. 11. In the example in FIG. 12, the CAG cell 3B broadcasts control information 1201 indicating an association between CAG ID #1 and S-NSSAI #2. The UE 1 has been configured with an Allowed CAG list 1202 and Allowed NSSAI 1203. The Allowed CAG list 1202 indicates CAG ID #1 and CAG ID #2. The Allowed NSSAI 1203 indicates S-NSSAI #1 and S-NSSAI #3. In the example in FIG. 12, none of the S-NSSAIs included in the Allowed NSSAI 1203 are associated in the broadcast control information 1201 with any of the CAG IDs included in the Allowed CAG list 1202. Accordingly, the UE 1 performs a cell reselection to search for another cell. In this case, the UE 1 may remove the CAG ID(s) being broadcast in the current cell (i.e., CAG ID #1 in the example in FIG. 12) from the Allowed CAG list for the current PLMN.

In this embodiment, the AN node 4B provides the UE 1 with control information indicating an association of each of at least one CAG ID with at least one S-NSSAI. The UE 1 then performs cell selection or reselection or both, taking into account the control information. This allows the UE 1 to consider the availability of network slices in cell selection or reselection based on CAG ID.

Figure 13:
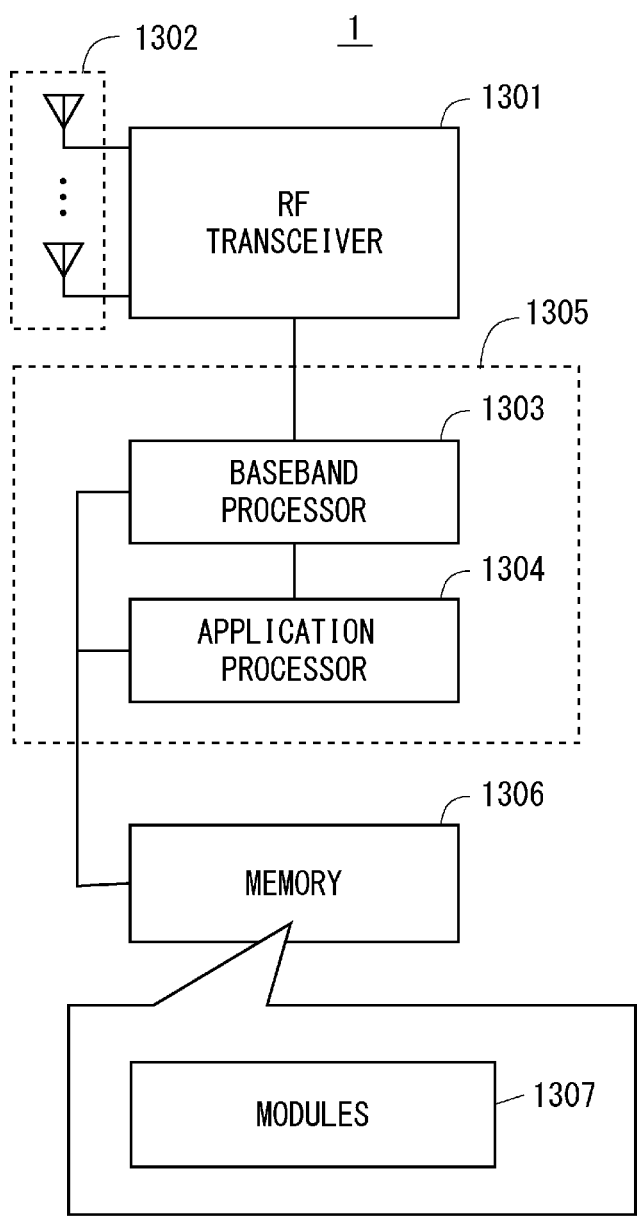
FIG. 13 is a block diagram showing an example configuration of a UE according to an embodiment.

The following provides configuration examples of the UE 1, the AMF 9, and the AN node 4B according to the above-described embodiments. FIG. 13 is a block diagram showing an example configuration of the UE 1. A Radio Frequency (RF) transceiver 1301 performs analog RF signal processing to communicate with RAN nodes. The RF transceiver 1301 may include a plurality of transceivers. The analog RF signal processing performed by the RF transceiver 1301 includes frequency up-conversion, frequency down-conversion, and amplification. The RF transceiver 1301 is coupled to an antenna array 1302 and a baseband processor 1303. The RF transceiver 1301 receives modulated symbol data (or OFDM symbol data) from the baseband processor 1303, generates a transmission RF signal, and supplies the transmission RF signal to the antenna array 1302. Further, the RF transceiver 1301 generates a baseband reception signal based on a reception RF signal received by the antenna array 1302 and supplies the baseband reception signal to the baseband processor 1303. The RF transceiver 1301 may include an analog beamformer circuit for beam forming. The analog beamformer circuit includes, for example, a plurality of phase shifters and a plurality of power amplifiers.

The baseband processor 1303 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame) (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1303 may include, for example, signal processing of Service Data Adaptation Protocol (SDAP), Packet Data Convergence Protocol (PDCP), Radio Link Control (RLC), Medium Access Control (MAC), and Physical (PHY) layers. Further, the control-plane processing performed by the baseband processor 1303 may include processing of Non-Access Stratum (NAS) protocols, Radio Resource Control (RRC) protocols, and MAC Control Elements (CEs).

The baseband processor 1303 may perform Multiple Input Multiple Output (MIMO) encoding and pre-coding for beam forming.

The baseband processor 1303 may include a modem processor (e.g., Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 1304 described in the following.

The application processor 1304 is also referred to as a CPU, an MPU, a microprocessor, or a processor core. The application processor 1304 may include a plurality of processors (or processor cores). The application processor 1304 loads a system software program (Operating System (OS)) and various application programs (e.g., a call application, a WEB browser, a mailer, a camera operation application, and a music player application) from a memory 1306 or from another memory (not shown) and executes these programs, thereby providing various functions of the UE 1.

In some implementations, as represented by a dashed line (1305) in FIG. 13, the baseband processor 1303 and the application processor 1304 may be integrated on a single chip. In other words, the baseband processor 1303 and the application processor 1304 may be implemented in a single System on Chip (SoC) device 1305. The SoC device may be referred to as a Large-Scale Integration (LSI) or a chipset.

The memory 1306 is a volatile memory, a non-volatile memory, or a combination thereof. The memory 1306 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1306 may include, for example, an external memory device that can be accessed from the baseband processor 1303, the application processor 1304, and the SoC 1305. The memory 1306 may include an internal memory device that is integrated in the baseband processor 1303, the application processor 1304, or the SoC 1305. Further, the memory 1306 may include a memory in a Universal Integrated Circuit Card (UICC).

The memory 1306 may store one or more software modules (computer programs) 1307 including instructions and data to perform the processing by the UE 1 described in the above embodiments. In some implementations, the baseband processor 1303 or the application processor 1304 may load these software modules 1307 from the memory 1306 and execute the loaded software modules, thereby performing the processing of the UE 1 described in the above embodiments with reference to the drawings.

The control-plane processing and operations performed by the UE 1 described in the above embodiments can be achieved by elements other than the RF transceiver 1301 and the antenna array 1302, i.e., achieved by the memory 1306, which stores the software modules 1307, and one or both of the baseband processor 1303 and the application processor 1304.

Figure 14:
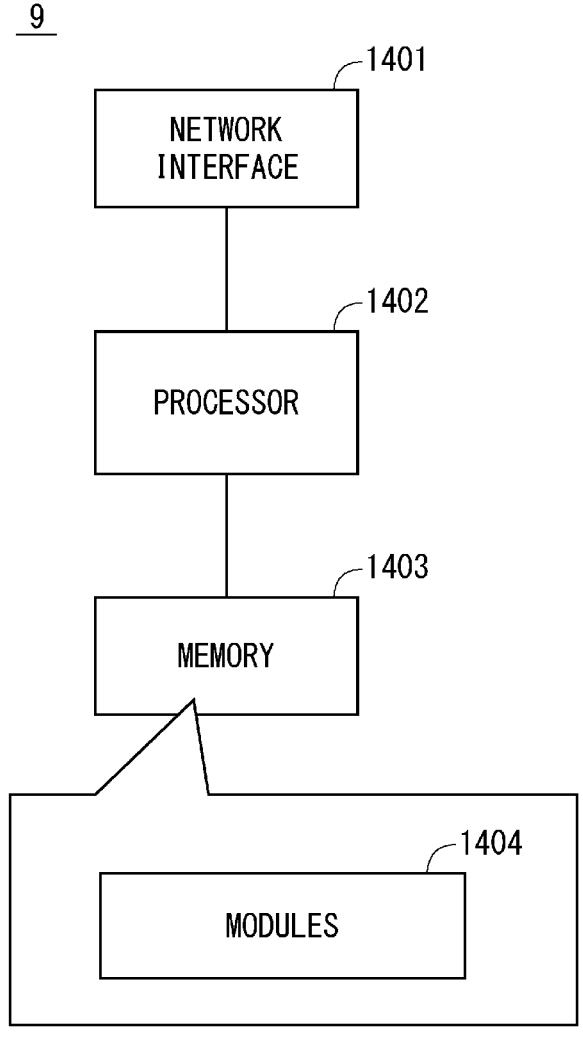
FIG. 14 is a block diagram showing an example configuration of an AMF according to an embodiment.

FIG. 14 shows an example configuration of the AMF 9. Referring to FIG. 14, the AMF 9 includes a network interface 1401, a processor 1402, and a memory 1403. The network interface 1401 is used to communicate, for example, with (R)AN nodes and with other network functions (NFs) or nodes in the 5GC. The other NFs or nodes in the 5GC include, for example, UDM, AUSF, SMF, and PCF. The network interface 1401 may include, for example, a network interface card (NIC) conforming to the IEEE 802.3 series.

The processor 1402 may be, for example, a microprocessor, a Micro Processing Unit (MPU), or a Central Processing Unit (CPU). The processor 1402 may include a plurality of processors.

The memory 1403 is composed of a volatile memory and a nonvolatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1403 may include a storage located apart from the processor 1402. In this case, the processor 1402 may access the memory 1403 via the network interface 1401 or an I/O interface.

The memory 1403 may store one or more software modules (computer programs) 1404 including instructions and data to perform the processing of the AMF 9 described in the above embodiments. In some implementations, the processor 1402 may be configured to load these software modules 1404 from the memory 1403 and execute the loaded software modules, thereby performing the processing of the AMF 9 described in the above embodiments.

Figure 15:
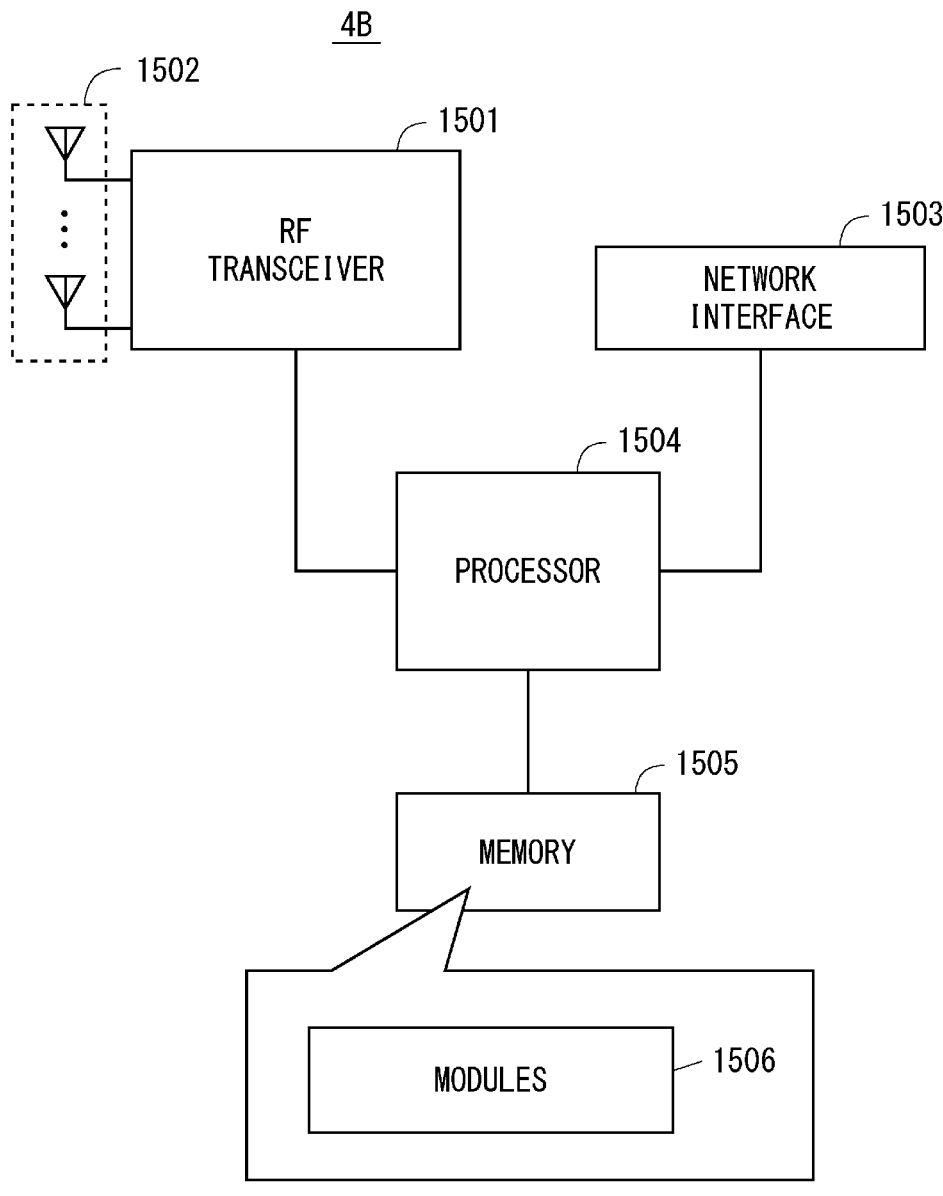
FIG. 15 is a block diagram showing an example configuration of an AN node according to an embodiment.

FIG. 15 is a block diagram showing an example configuration of the AN node 4B. Referring to FIG. 15, the AN node 4B includes an RF transceiver 1501, a network interface 1503, a processor 1504, and a memory 1505. The RF transceiver 1501 performs analog RF signal processing to communicate with UEs. The RF transceiver 1501 may include a plurality of transceivers. The RF transceiver 1501 is coupled to an antenna array 1502 and the processor 1504. The RF transceiver 1501 receives modulated symbol data from the processor 1504, generates a transmission RF signal, and supplies the transmission RF signal to the antenna array 1502. Further, the RF transceiver 1501 generates a baseband reception signal based on a reception RF signal received by the antenna array 1502 and supplies the baseband reception signal to the processor 1504. The RF transceiver 1501 may include an analog beamformer circuit for beam forming. The analog beamformer circuit includes, for example, a plurality of phase shifters and a plurality of power amplifiers.

The network interface 1503 is used to communicate with network nodes (e.g., other AN nodes and core network nodes). The network interface 1503 may include, for example, a network interface card (NIC) conforming to the IEEE 802.3 series.

The processor 1504 performs digital baseband signal processing (i.e., data-plane processing) and control-plane processing for radio communication. The processor 1504 may include a plurality of processors. The processor 1504 may include, for example, a modem processor (e.g., DSP) that performs digital baseband signal processing and a protocol stack processor (e.g., CPU or MPU) that performs the control-plane processing.

The digital baseband signal processing performed by the processor 1504 may include, for example, signal processing of SDAP, PDCP, RLC, MAC, and PHY layers. The control-plane processing performed by the processor 1504 may include processing of NAS protocols, RRC protocols, MAC CEs, and DCIs.

The processor 1504 may include a digital beamformer module for beam forming. The digital beamformer module may include a Multiple Input Multiple Output (MIMO) encoder and a pre-coder.

The memory 1505 is composed of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1505 may include a storage located apart from the processor 1504. In this case, the processor 1504 may access the memory 1505 via the network interface 1503 or an I/O interface.

The memory 1505 may store one or more software modules (computer programs) 1506 including instructions and data to perform processing by the AN node 4B described in the above embodiments. In some implementations, the processor 1504 may be configured to load these software modules 1506 from the memory 1505 and execute the loaded software modules, thereby performing processing of the AN node 4B described in the above embodiments.

When the AN node 4B is a Central Unit (e.g., gNB-CU) in a cloud RAN (C-RAN) deployment, the AN node 4B does not need to include the RF transceiver 1501 (and the antenna array 1502).

As described using FIG. 13, FIG. 14, and FIG. 15, each of the processors in the UE 1, AMF 9, and AN node 4B according to the embodiments described above executes one or more programs, containing a set of instructions, to cause a computer to perform an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

The above-described embodiments are merely examples of applications of the technical ideas obtained by the inventors. These technical ideas are not limited to the above-described embodiments and various modifications can be made thereto.

The whole or part of the embodiments disclosed above can be described as, but not limited to, the following supplementary notes.

(Supplementary Note 1)

A User Equipment (UE) comprising:

at least one memory; and at least one processor coupled to the at least one memory and configured to:

receive, from a network, control information indicating an association of each of at least one Closed Access Group (CAG) ID with at least one network slice identifier; and perform cell selection or cell reselection using the control information.

(Supplementary Note 2)

The UE according to Supplementary Note 1, wherein the at least one processor is configured to receive the control information from a core network node for mobility management in a core network.

(Supplementary Note 3)

The UE according to Supplementary Note 2, wherein the at least one processor is configured to, if no allowed network slice identifier stored in the UE is associated in the control information with a CAG ID being broadcast in a current cell of the UE, search for a cell other than the current cell.

(Supplementary Note 4)

The UE according to Supplementary Note 2, wherein the at least one processor is configured to, if no network slice identifier being broadcast in a current cell of the UE is associated in the control information with any CAG ID being broadcast in the current cell, search for a cell other than the current cell.

(Supplementary Note 5)

The UE according to any one of Supplementary Notes 2 to 4, wherein the at least one processor is configured to send a request for the control information to the core network node.

(Supplementary Note 6)

The UE according to Supplementary Note 5, wherein the request contains the at least one CAG ID.

(Supplementary Note 7)

The UE according to any one of Supplementary Notes 2 to 6, wherein the at least one processor is configured to receive a list of at least one allowed CAG ID from the core network node, wherein each allowed CAG ID in the list indicates that the UE is allowed to access a Public Network Integrated Non-Public Network (PNI-NPN) via a CAG cell associated with this allowed CAG ID.

(Supplementary Note 8)

The UE according to Supplementary Note 7, wherein the at least one processor is configured to receive the control information and the list of at least one allowed CAG ID from the core network node via a single Non-Access Stratum (NAS) message or different NAS messages.

(Supplementary Note 9)

The UE according to any one of Supplementary Notes 2 to 8, wherein the at least one processor is configured to receive from the core network node a list of at least one allowed network slice identifier that is available for the UE in a current registration area.

(Supplementary Note 10)

The UE according to Supplementary Note 9, wherein the at least one processor is configured to receive the control information and the list of at least one allowed network slice identifier from the core network node via a single Non-Access Stratum (NAS) message or different NAS messages.

(Supplementary Note 11)

The UE according to Supplementary Note 1, wherein the at least one processor is configured to obtain the control information from information broadcast in a current cell of the UE.

(Supplementary Note 12)

The UE according to Supplementary Note 11, wherein the at least one processor is configured to, if no allowed network slice identifier stored in the UE is associated in the control information with any allowed CAG ID stored in the UE, search for a cell other than the current cell.

(Supplementary Note 13)

A core network node for mobility management used in a core network, the core network node comprising:

at least one memory; and at least one processor coupled to the at least one memory and configured to send, to a User Equipment (UE), control information indicating an association of each of at least one Closed Access Group (CAG) ID with at least one network slice identifier.

(Supplementary Note 14)

The core network node according to Supplementary Note 13, wherein the control information is used by the UE for cell selection or cell reselection or both.

(Supplementary Note 15)

The core network node according to Supplementary Note 13 or 14, wherein the control information causes the UE to, if no allowed network slice identifier stored in the UE is associated in the control information with any CAG ID being broadcast in a current cell of the UE, search for a cell other than the current cell.

15

(Supplementary Note 16)

The core network node according to Supplementary Note 13 or 14, wherein the control information causes the UE to, if no network slice identifier being broadcast in a current cell of the UE is associated in the control information with any CAG ID being broadcast in the current cell, search for a cell other than the current cell.

(Supplementary Note 17)

The core network node according to any one of Supplementary Notes 14 to 16, wherein the at least one processor is configured to send the control information to the UE in response to receiving a request for the control information from the UE.

(Supplementary Note 18)

The core network node according to Supplementary Note 17, wherein the request contains the at least one CAG ID.

(Supplementary Note 19)

The core network node according to any one of Supplementary Notes 13 to 18, wherein the at least one processor is configured to send a list of at least one allowed CAG ID to the UE, wherein each allowed CAG ID in the list indicates that the UE is allowed to access a Public Network Integrated Non-Public Network (PNI-NPN) via a CAG cell associated with this allowed CAG ID.

(Supplementary Note 20)

The core network node according to Supplementary Note 19, wherein the at least one processor is configured to send the control information and the list of at least one allowed CAG ID to the UE via a single Non-Access Stratum (NAS) message or different NAS messages.

(Supplementary Note 21)

The core network node according to any one of Supplementary Notes 13 to 20, wherein the at least one processor is configured to send to the UE a list of at least one allowed network slice identifier that is available for the UE in a current registration area.

(Supplementary Note 22)

The core network node according to Supplementary Note 21, wherein the at least one processor is configured to send the control information and the list of at least one allowed network slice identifier to the UE via a single Non-Access Stratum (NAS) message or different NAS messages.

(Supplementary Note 23)

An access network (AN) node used in an AN, the AN node comprising:

at least one memory; and at least one processor coupled to the at least one memory and configured to broadcast, in a cell, control information indicating an association of each of at least one Closed Access Group (CAG) ID with at least one network slice identifier.

(Supplementary Note 24)

The AN node according to Supplementary Note 23, wherein the control information is used by the UE for cell selection or cell reselection or both.

(Supplementary Note 25)

The AN node according to Supplementary Note 24, wherein the control information causes the UE to search for another cell if no allowed network slice identifier stored in the UE is associated in the control information with any allowed CAG ID stored in the UE.

(Supplementary Note 26)

A method performed by a User Equipment (UE), the method comprising:

receiving, from a network, control information indicating an association of each of at least one Closed Access Group (CAG) ID with at least one network slice identifier; and performing cell selection or cell reselection or both using the control information.

(Supplementary Note 27)

A method performed by a core network node for mobility management used in a core network, the method comprising:

sending, to a User Equipment (UE), control information indicating an association of each of at least one Closed Access Group (CAG) ID with at least one network slice identifier.

(Supplementary Note 28)

A method performed by an access network (AN) node used in an AN, the method comprising:

broadcasting, in a cell, control information indicating an association of each of at least one Closed Access Group (CAG) ID with at least one network slice identifier.

(Supplementary Note 29)

A non-transitory computer readable medium storing a program for causing a computer to perform a method for a User Equipment (UE), the method comprising:

receiving, from a network, control information indicating an association of each of at least one Closed Access Group (CAG) ID with at least one network slice identifier; and performing cell selection or cell reselection using the control information.

(Supplementary Note 30)

A non-transitory computer readable medium storing a program for causing a computer to perform a method for a core network node for mobility management used in a core network, the method comprising:

sending, to a User Equipment (UE), control information indicating an association of each of at least one Closed Access Group (CAG) ID with at least one network slice identifier.

(Supplementary Note 31)

A non-transitory computer readable medium storing a program for causing a computer to perform a method for an access network (AN) node used in an AN, the method comprising:

broadcasting, in a cell, control information indicating an association of each of at least one Closed Access Group (CAG) ID with at least one network slice identifier.

This application is based upon and claims the benefit of priority from Japanese Patent Application No. 2020-174587, filed on Oct. 16, 2020, the disclosure of which is incorporated herein in its entirety by reference.

REFERENCE SIGNS LIST

1 UE
2 PLMN
3A Normal PLMN Cell
3B CAG Cell
4A, 4B AN Node
5 5GC
6 Private Network
7 NPN 5GC
8 NPN Service
9 AMF
1303 Baseband Processor
1304 Application Processor
1306 Memory

1307 Modules
1402 Processor
1403 Memory
1404 Modules
1504 Processor
1505 Memory
1506 Modules

What is claimed is:

1. A User Equipment (UE) comprising:
at least one memory; and
at least one processor coupled to the at least one memory and configured to:
receive, from a network node, first group information, wherein the first group information comprises a list of second group information,
wherein each of the second group information comprises an identifier of the second group information and a list of Single Network Slice Selection Assistance Information (S-NSSAI) associated with the second group information, and
wherein a format of the second group information is arranged in order of the identifier of the second group information and thereafter the list of S-NSSAI; and
perform at least one of cell selection or cell reselection.

2. The UE according to claim 1, wherein the first group information is used for at least one of cell selection or cell reselection.

3. The UE according to claim 1, wherein the network node is an Access and Mobility Management Function and the first group information is included in a Registration Accept message.

4. A network node for mobility management, the network node comprising:
at least one memory; and
at least one processor coupled to the at least one memory and configured to send, to a User Equipment (UE), first group information,
wherein the first group information comprises a list of second group information,
wherein each of the second group information comprises an identifier of the second group information and a list of Single Network Slice Selection Assistance Information (S-NSSAI) associated with the second group information, and
wherein a format of the second group information is arranged in order of the identifier of the second group information and thereafter the list of S-NSSAI.

5. The network node according to claim 4, wherein the first group information is used by the UE for at least one of cell selection or cell reselection.

6. The network node according to claim 4, wherein the network node is an Access and Mobility Management Function and the first group information is included in a Registration Accept message.

7. A method performed by a User Equipment (UE), the method comprising:
receiving, from a network node, first group information, wherein the first group information comprises a list of second group information,
wherein each of the second group information comprises an identifier of the second group information and a list of Single Network Slice Selection Assistance Information (S-NSSAI) associated with the second group information, and
wherein a format of the second group information is arranged in order of the identifier of the second group information and thereafter the list of S-NSSAI; and
performing at least one of cell selection or cell reselection.

8. The method according to claim 7, wherein the first group information is used for at least one of cell selection or cell reselection.

9. The method according to claim 7, wherein the network node is an Access and Mobility Management Function and the first group information is included in a Registration Accept message.

10. A method performed by a network node for mobility management, the method comprising:
sending, to a User Equipment (UE), first group information,
wherein the first group information comprises a list of second group information,
wherein each of the second group information comprises an identifier of the second group information and a list of Single Network Slice Selection Assistance Information (S-NSSAI) associated with the second group information, and
wherein a format of the second group information is arranged in order of the identifier of the second group information and thereafter the list of S-NSSAI.

11. The method according to claim 10, wherein the first group information is used by the UE for at least one of cell selection or cell reselection.

12. The method according to claim 10, wherein the network node is an Access and Mobility Management Function and the first group information is included in a Registration Accept message.

* * * * *